Figure 1:
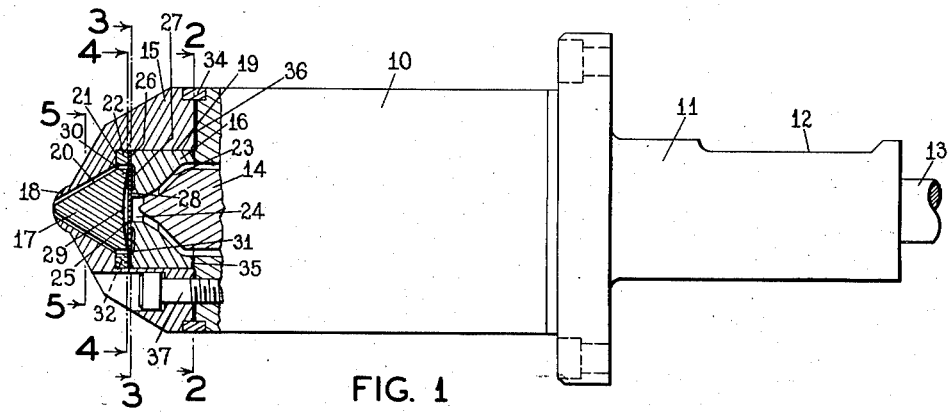
Figure 2:
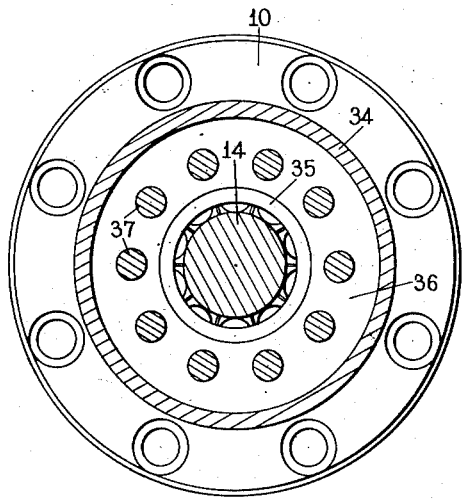
Figure 3:
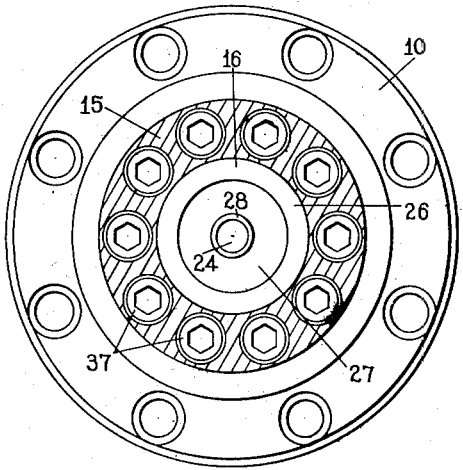
Figures 4, 5:
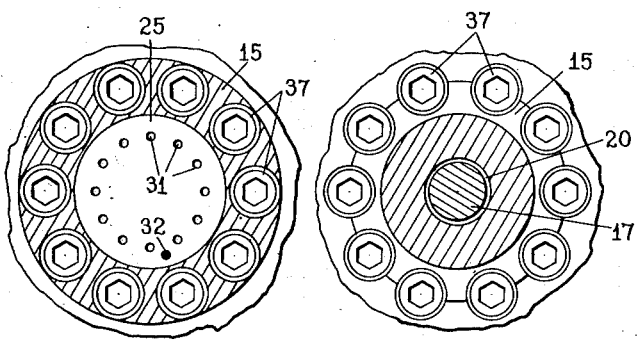

Dec. 25, 1951     W. H. FELLOWS ET AL     2,579,809

LEAKAGE PREVENTION FOR INJECTION MOLDING NOZZLES

Filed March 1, 1948

INVENTORS
WILLIAM H. FELLOWS
CLARENCE W. BURNHAM

ATTYS

Patented Dec. 25, 1951

2,579,809

UNITED STATES PATENT OFFICE 2,579,809

LEAKAGE PREVENTION FOR INJECTION MOLDING NOZZLES

William H. Fellows and Clarence W. Burnham, Springfield, Vt., assignors to The Fellows Gear Shaper Company, Springfield, Vt., a corporation of Vermont Application March 1, 1948, Serial No. 12,208

7 Claims. (Cl. 18—30)

This invention relates to the manufacture of molded articles from thermoplastic resins by injection from a nozzle into a mold made of separable parts. The material to be molded is provided in powdered or granular condition into a heating chamber and forced by a plunger from a nozzle at one end of the chamber into the admission orifice of a mold placed close against the outer surface of the nozzle.

It has been found that when the plastic material is of such nature that it is freely fluid when in its heated condition, leakage of the plastic from the nozzle occurs when the parts of the mold are separated to remove the molded article; and such leakage occurs even though the piston be retracted at such times. While some plastics are sufficiently viscous and cohesive when heated to fluidity as not to leak under such conditions, yet others when heated to the necessary degree become very fluid and leak from nozzles of the types heretofore used. The material known as nylon is one of the latter class of plastics.

Our object has been to provide injection molding apparatus with means effective to prevent such leakage of plastics which are highly fluid when heated for injection into a mold. The preferred embodiments of the means which we have provided for this purpose are described in the following specification with reference to the accompanying drawings.

Figure 6:
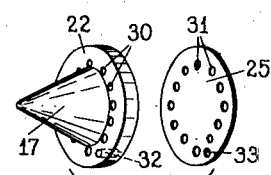

In the drawings:

Fig. 1 is a side elevation partially broken away and shown in section of an injection heating chamber and nozzle in which our leakage preventing means are contained;

Figs. 2, 3, 4 and 5 are cross sections taken on lines 2—2, 3—3, 4—4 and 5—5, respectively, of Fig. 1;

Fig. 6 is a perspective view of a cone which forms part of the emission end of the injection nozzle and a diaphragm which constitutes one element of leakage preventing means.

Like reference characters designate the same parts wherever they occur in all the figures.

The heating chamber 10 (which will generally be called a "cylinder" in the following specification, because of its form and in accordance with the customary terminology of the art, but without limiting intent), admission cylinder 11 having an opening 12 at one side into which granular material is introduced, plunger or piston 13 which is reciprocated endwise of the cylinders, and separator or torpedo 14 centrally located in the cylinder 10 may be of the same construction or character as corresponding parts shown in the application of Clarence W. Burnham Serial No. 746,052, filed May 5, 1947 (on which Patent No. 2,482,243, dated September 20, 1949, has been issued), or may have any other character suitable for the purpose. The features novel with the present invention reside in leakage preventing means connected with the delivery end of the cylinder 10, here shown as contained partly in a nozzle attached to the cylinder and in accessory features associated therewith.

The nozzle in the embodiment here illustrated is comprised by a cap 15, a cylindrical block 16 and a cone 17. The cap is of generally conical external form tapering from a base of approximately the same outside diameter as cylinder 10 to a central boss 18 of generally spherical convex curvature. Internally the cap is formed with a central cylindrical cavity 19 opening from its base and a central conical bore 20 tapering from the inner end of the cylindrical cavity to an outlet orifice of small diameter in the center of boss 18. A shoulder 21 is provided at the inner end of the cylindrical cavity 19 surrounding the entrance to the conical cavity or bore 20. Cone 17 has a flange 22 at the base which fits the cylindrical recess 19 and bears against the shoulder 21. Its conical taper is substantially the same as that of the conical bore 20 and is of smaller diameter in all planes perpendicular to the common axis when seated in the cap as shown, whereby a conical annular space is left for flow of plastic to the orifice at the center of boss 18.

The cylindrical block 16 is fitted as to its exterior to the walls of the cylindrical cavity 19 so that it can enter freely therein. It is made with a central passageway or bore 23 of similar profile to the adjacent end of the torpedo 14, which projects into it when the nozzle is assembled with the heating cylinder, and enough larger than the end of the torpedo to leave a conical annular space for flow of plastic, terminating in a central outlet portion 24.

One of the leakage preventing means is provided by valve means arranged to control flow of the plastic material through the nozzle and from the outlet orifice, being urged in one direction by pressure of the plastic and automatically moved in the opposite direction. In the presently illustrated embodiment, such valve means is a diaphragm 25 interposed between the base of cone 17 and the adjacent end of block 16. The diaphragm is confined at its circumference between the flange 22 of cone 17 and an annular surface 26 at the circumference of block 16. An annular recess 27 is formed in the face of the block next to the diaphragm between the clamping part 26 and a narrow cylindrical rib 28 which surrounds the portion 24 of the bore through the block and serves as a valve seat for the diaphragm. These parts are so proportioned and located that, when the diaphragm is circumferentially clamped between the flange 22 and clamping part 26, its central portion overlies and bears firmly against the rib 28. It is normally so held by its inherent stiffness and resilience, but may be displaced by fluid pressure of sufficient magnitude. A shallow concavity 29 is formed in the base of cone 17 located between flange 22 and rib 28 to permit flexure of the diaphragm under fluid pressure exerted from within the cylinder 10, whereby the diaphragm can be separated from the seating rib 28, allowing plastic to flow across this rib into the annular recess 27. Holes 30 are disposed in circular series through the flange 22 at the base of cone 17 between the annular recess 27 and the conical passageway 20 in the cap which surrounds the cone; and the diaphragm is provided with a like series of holes 31 spaced equally to the holes 30 and at the same distance as such holes from the common axis of the cone and diaphragm. A dowel 32 is mounted in the flange 22 and a hole 33 is provided in the diaphragm to receive the dowel, this dowel and hole being disposed to cause alinement of the holes 30 and 31 when the cone and diaphragm are assembled in cap 15.

The resilience of the diaphragm, which is flexed from normal position whenever plastic is forced out of the nozzle, causes it to return into seating contact with the rib 28 when plunger 13 is withdrawn. Any force necessary for thus closing the passageway 24 to prevent leakage can be obtained by making the diaphragm of sufficiently stiff resilient material, and by fashioning the adjacent end of the block 16 so that the rib 28 projects more or less beyond the plane of the clamping surface 26 so as to flex the diaphragm and apply initial tension thereto when the parts are assembled and clamped together.

To prevent leakage between the end of cylinder 10 and the base of cap 15, a preloading ring 34 is placed in a groove which is formed partly in the end of the cylinder 10 and partly in the adjacent base of cap 15, at the outer circumference of both, and a bearing surface 35 of limited width for the block 16 is provided on the end of the cylinder surrounding the bore thereof; the end face of the cylinder being recessed at 36 from the outer circumference of the said bearing surface to the bottom of the groove which contains ring 34. Or the block may be made of such length that its end protrudes somewhat from the base of cap 15 without the provision of such a recess. Bolts 37, arranged in an arc located between the bearing 35 and ring 34, occupy cavities in the cap 15 and enter tapped holes in the end of the cylinder.

Preferably the end face of the block 16 next to the cylinder 10 is beveled at a small acute angle away from the surface 35 and from the bore 23 so that the initial contact, when the parts are brought together, is little wider than line contact and a more intense unit pressure can be applied and a tighter closure obtained when the connecting bolts are tightened than would be the case if both surfaces were parallel. However, although this is a useful feature, it is not an essential one and the contact surfaces may both be in planes perpendicular to the axis, or both beveled at the same angle. In any event, the endwise bearing between the nozzle and cylinder is limited to a narrow annular zone closely surrounding the bore of the cylinder.

The width (i. e., axial length) of the preloading ring 34 is slightly less than the width of the groove which receives it; enough so to cause the first endwise bearing to occur at the surface 35 when the parts are assembled. But the difference in width (clearance) is so small that the ring is enabled to serve as a stop, limiting the closing up movement that can be imparted to the cap when the bolts are tightened. The ring has also another function, which is to centralize cap 15 with the bore of cylinder 10.

The pressure of the bolts is applied through shoulder 21 to and through flange 22 of cone 17, and the margin of diaphragm 25, to block 16, and to heating cylinder 10, whereby these parts are pressed closely together and the diaphragm is securely clamped.

It will be appreciated that, by reason of the tight closure at the bearing surface 35, the preloading ring 34 which encircles the contiguous parts of the cylinder and nozzle cap, and the diaphragm 25, no outflow of liquid plastic is possible except when pressure is exerted by the plunger strong enough to flex the diaphragm into the cavity 29 and thus open a passageway around the rib 28 to the annular groove 27 and thence through registering holes 31 and 30 to the annular space around cone 17 and the nozzle orifice. When the internal pressure is relieved, the diaphragm springs back and presses strongly on the rib 28, thus preventing all leakage.

What we claim is:

1. In injection molding apparatus the combination with a heating chamber and means for propelling fluid plastic therethrough, of a nozzle secured to the delivery end of the chamber comprising interconnected members having a tight thrust bearing contact with the chamber around the bore therein and including a passageway surrounded by a raised rib, and a diaphragm clamped at its margin between said interconnected members normally in bearing contact with said raised rib and being arranged to be flexed away from the rib by fluid pressure within the chamber, said diaphragm having passageways located outside of the area which overlies said rib and communicating with the external orifice of the nozzle.

2. In injection molding apparatus the combination with a heating chamber and means for propelling fluid plastic therethrough, of a nozzle secured to the delivery end of the chamber comprising a cap having a base portion disposed contiguous to the end of the chamber and formed with a cavity opening from the base surface, an internal shoulder at the bottom of said cavity and a tapered bore terminating in an orifice at the outer surface of the cap, an internal member having a flange fitted to occupy said cavity and bear against said shoulder and having also a tapering portion of similar contours to and smaller dimensions than the tapering bore of the cap contained in said bore, a block occupying said cavity, a diaphragm contained between the marginal portion of said block and the before named flange, the block being held in leakage tight contact with the end of the chamber and having a passageway registering with the bore of the chamber and terminating in the mid portion of the block at the face thereof contiguous to the diaphragm, the block being also formed with a bearing rib surrounding the passageway in contact with the diaphragm and with an outer space communicating through holes in the diaphragm and flange with the space between the tapered bore of the cap and the member which extends thereinto.

3. In injection molding apparatus the combination with a heating cylinder and means for propelling fluid plastic therethrough, of a nozzle secured to the delivery end of the cylinder comprising a cap having a base portion contiguous to the cylinder end, a preloading ring contained in a groove formed partly in the outer circumference of the cylinder and partly in the outer circumference of the base of the cap and being of less axially extending width than the groove, said cap having an interior central cavity, a shoulder at the inner limit of said cavity, and a tapered bore leading from said shoulder to a central orifice, a tapered member located in said tapered bore having a base flange seated against the before named shoulder, a diaphragm bearing against the flange, a block occupying said cavity and bearing at its marginal portion on the diaphragm, and bolts passing through the cap outside of the cavity into threaded connection with the cylinder; said block having a through passage registering with the bore of the cylinder and being held in forcible surface contact at its margin with the end surface of the cylinder around the bore thereof, said through passage terminating at the central part of the diaphragm in the opposite face of the block, and the block being formed with a raised rib surrounding the terminal portion of the passage, against which the diaphragm bears, and having a space outside of said rib communicating through holes in the diaphragm and the before named flange with the bore of the cap.

4. In injection molding apparatus the combination with a heating cylinder and means for propelling fluid plastic therethrough, of a nozzle secured to the delivery end of the cylinder comprising a cap having a base substantially coequal in diameter with the cylinder and a tapered exterior, having a central cavity opening from its base portion and a bore of progressively contracting diameter leading from said cavity to an orifice at the outer face of the cap, there being a shoulder between said cavity and bore, a cone having a flange at its base occupying said cavity and bearing against said shoulder, the cone being tapered correspondingly to said bore and separated from the walls of the bore, there being a series of holes through the flange communicating with the space between said wall and the cone, and the base of the cone being formed with a shallow cavity, a diaphragm bearing against the flange and extending over the cavity in the base of the cone and having a series of holes registering with those of the first named series, a block contained in said cavity bearing at its margin on the diaphragm at the side thereof opposite to the before mentioned flange, said block having in its face next to the diaphragm an annular recess communicating with said holes and an annular rib surrounding the axis of the block and forming the inner boundary of said recess, the block having also a through passage of which one terminal is in the area surrounded by said rib and the other terminal registers with the bore of the cylinder, clamping means securing the cap to the cylinder, said parts being arranged so that the margin of the block bears tightly against the end face of the cylinder contiguous to the bore thereof.

5. In injection molding apparatus, the combination with a heating chamber and means for propelling fluid plastic therethrough, of a nozzle secured to the delivery end of the chamber having a through passageway, including a valve seat between the extremities of such passageway and a diaphragm secured in the nozzle extending across the passageway and being normally in closing contact with the valve seat, there being a clearance space within the nozzle disposed to permit flexing of the diaphragm away from the valve seat by pressure of fluid within the chamber.

6. In injection molding apparatus, the combination with a heating chamber and a nozzle having interior conducting spaces for outflow of fluid plastic material and including a valve seat surrounding a portion of such conducting spaces, of a diaphragm valve secured at its margin in said combination with its central portion normally in closing contact with said valve seat but being displaceable from the valve seat under pressure of fluid within the heating chamber.

7. In injection molding apparatus having a heating chamber and means for propelling fluid plastic material therethrough, a nozzle secured to the delivery end of the chamber having an interior passageway including narrow and wide portions in communication with one another, and diaphragm mounted in the wide portion of said passageway crossing the narrow portion and arranged to occlude the latter portion, said diaphragm being displaceable by pressure of fluid in the heating chamber to permit outward passage of the fluid.

WILLIAM H. FELLOWS.
CLARENCE W. BURNHAM.

REFERENCES CITED

The following references are of record in the file of this patent:

UNITED STATES PATENTS

| Number | Name | Date |
|---|---|---|
| 2,043,584 | Husted | June 9, 1936 |
| 2,308,867 | Dinzl | Jan. 19, 1943 |
| 2,309,943 | Ernst | Feb. 2, 1943 |
| 2,345,917 | Coffman | Apr. 4, 1944 |
| 2,373,939 | Bailey | Apr. 17, 1945 |